United States Patent [19]

Siems et al.

[11] Patent Number: 5,221,065
[45] Date of Patent: Jun. 22, 1993

[54] MOUNTING BRACKET FOR RESTRAINT OF ELONGATE ARTICLES

[75] Inventors: W. Peter Siems; Richard H. Munson, both of Peoria, Ill.

[73] Assignee: Caterpillar Inc., Peoria, Ill.

[21] Appl. No.: 868,904

[22] Filed: Apr. 16, 1992

[51] Int. Cl.$^5$ .............................................. F16L 3/08
[52] U.S. Cl. ..................................................... 248/65
[58] Field of Search ........................ 248/65, 68.1, 74.3, 248/74.1, 73, 71; 174/164, 168, 158 R

[56] References Cited

U.S. PATENT DOCUMENTS

| | | | |
|---|---|---|---|
| 2,438,362 | 3/1948 | Dunkelberger et al. | 174/40 |
| 2,709,558 | 5/1955 | Young | 248/74.3 |
| 2,850,560 | 9/1958 | Heyob et al. | 174/138 |
| 2,923,510 | 2/1960 | Walch | 248/68.1 |
| 3,087,700 | 10/1960 | Carpenter et al. | 248/74 |
| 3,445,898 | 10/1967 | Goodrich | 24/16 |
| 3,588,964 | 6/1970 | Dudley et al. | 24/16 |
| 3,632,070 | 1/1972 | Thayer | 248/68 |
| 3,891,131 | 6/1975 | Tabata | 224/25 |
| 3,913,786 | 10/1975 | McSherry | 248/74 PB |
| 4,795,856 | 1/1989 | Farmer | 248/68.1 X |
| 4,865,279 | 9/1989 | Kosugi | 248/68.1 |
| 4,957,251 | 9/1990 | Hubbard | 248/68.1 |
| 4,960,253 | 10/1990 | Perrault et al. | 248/68.1 |

OTHER PUBLICATIONS

Exhibit A–Caterpillar Specification for clips used on tubes, hoses, wire harness, cables, engine accessories, etc. 1 page.
Exhibit B–Front and back covers and pages B12, B14, B15, and B20 of Panduit corp. Catalog E-102, published prior to Invention of above identified application.

Primary Examiner—Ramon O. Ramirez
Attorney, Agent, or Firm—Kenneth A. Rhoads

[57] ABSTRACT

Presently available mounting brackets do not permit preassembly or require expensive and time consuming methods of manufacture. It is desirable to provide a mounting bracket which may be inexpensively manufactured, allows easy insertion of a flexible securing element and which may be preassembled prior to attachment of an elongate article it supports. The subject arrangement provides a mounting bracket including a substantially flat, elongate body having a mounting end portion and a securing end portion. The securing end portion extends both longitudinally and at an oblique angle from the mounting end portion so that the securing end portion is spaced apart from a carrier member to which the mounting bracket is attached. The securing end portion permits installation of a flexible securing element securing thereto the elongate article to be supported. This arrangement permits preassembly of the mounting bracket and supports the elongate article in spaced apart relation to the carrier member as well as permitting easy insertion of the flexible securing element without requiring expensive manufacturing methods.

10 Claims, 2 Drawing Sheets

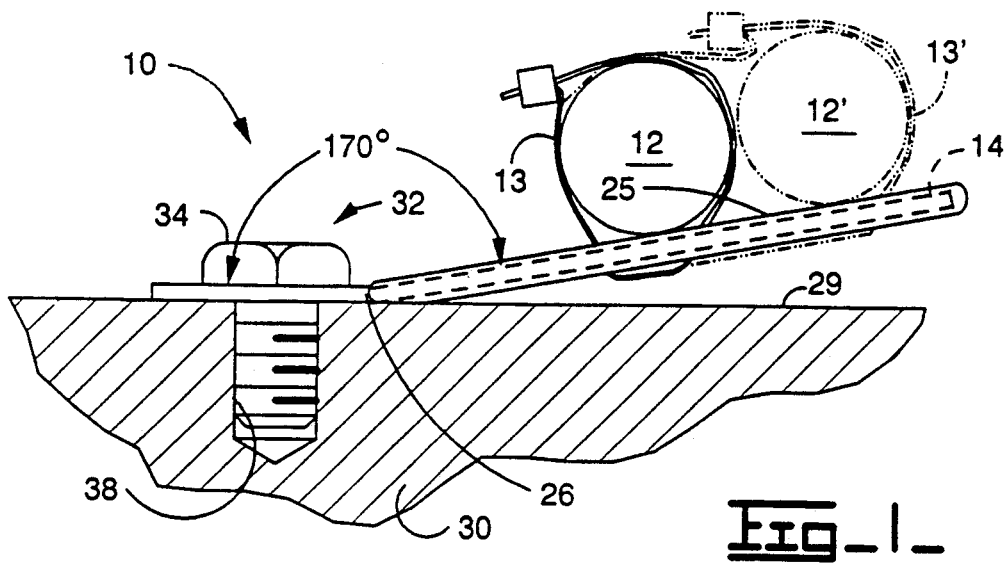
Fig_1_
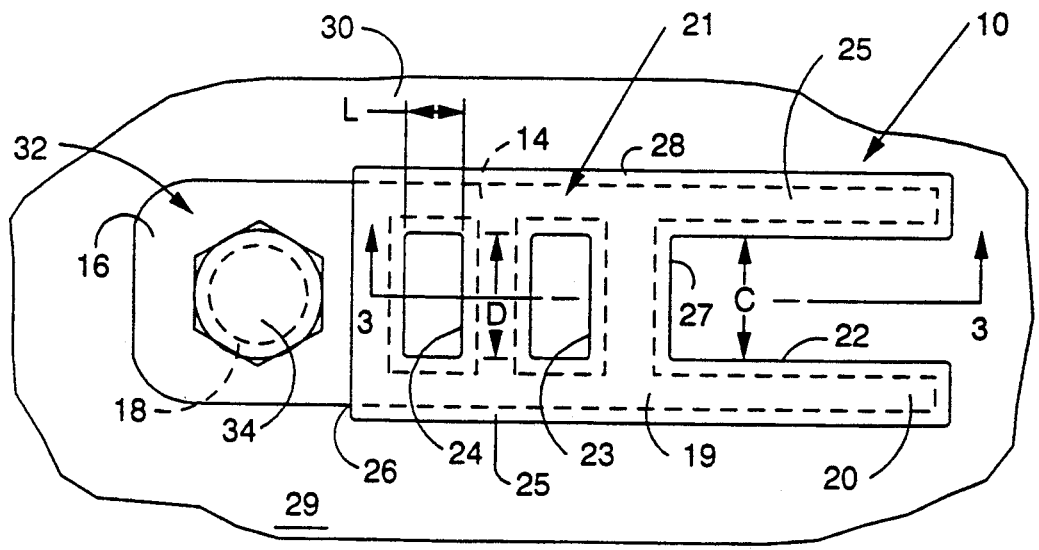
Fig_2_
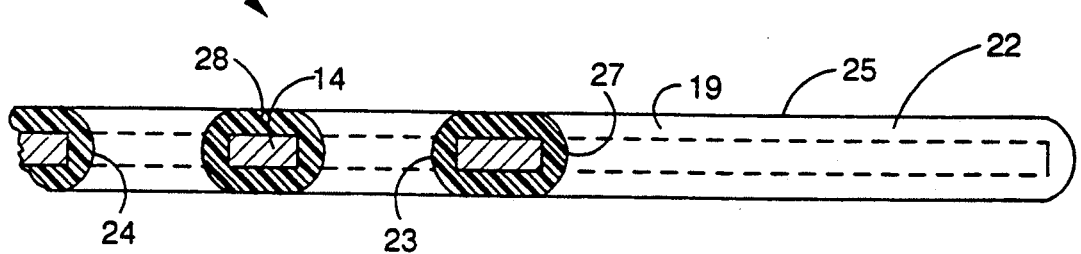
Fig_3_

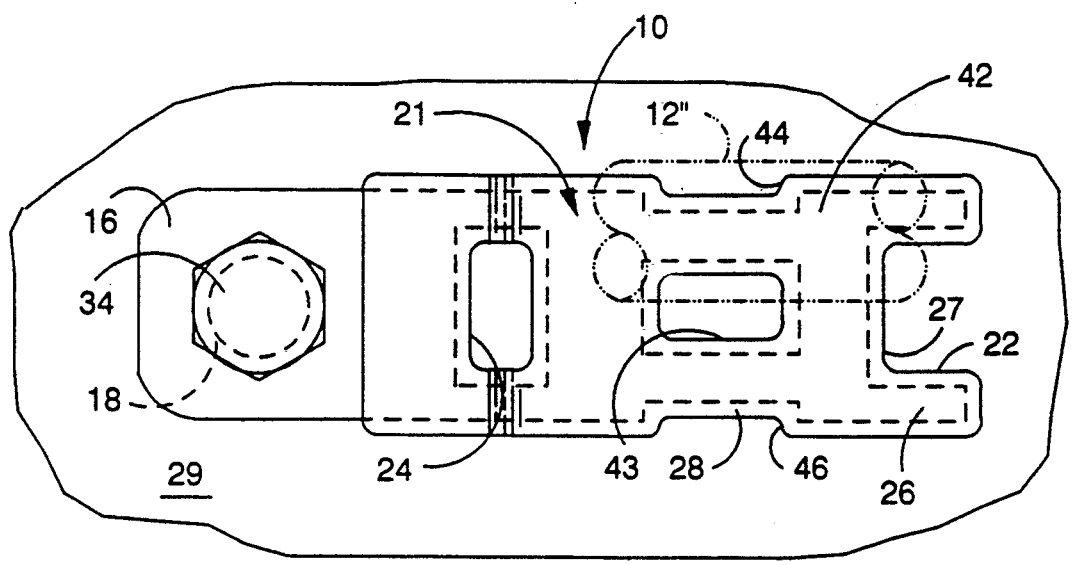
Fig_4_
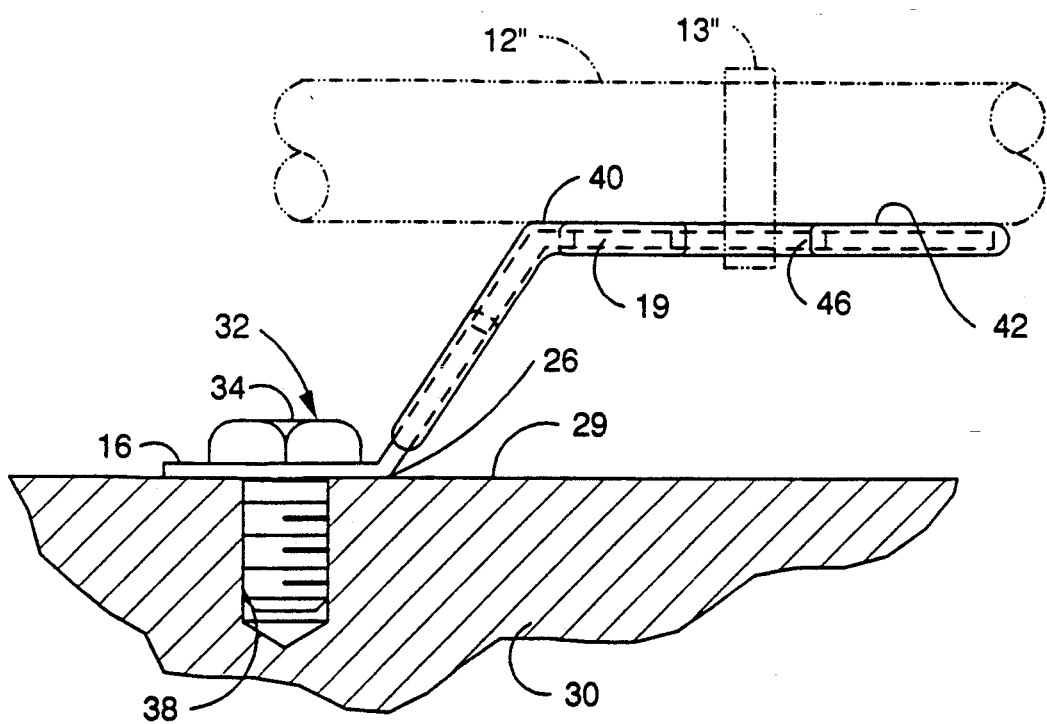
Fig_5_

MOUNTING BRACKET FOR RESTRAINT OF ELONGATE ARTICLES

DESCRIPTION

1. Technical Field

This invention relates generally to a mounting bracket for elongate articles such as wiring harnesses, tubes and hoses or the like.

2. Background Art

Earthmoving equipment, engines and material handling equipment utilize many elongate articles such as, wiring harnesses, tubes, hoses and cables. In the past many styles of mounting brackets or restraints have been used to restrain such elongate articles to avoid interference with and damage by moving parts of such equipment. Additionally, such restraints are intended to prevent movement of the elongate articles which could result in wear and damage by contact with various parts of the equipment or the restraints. The fixed size retaining portion of these restraints also require inventory of several hundred sizes of the restraints to accommodate the various sizes of the elongate articles. This can also result in an imperfect fit with the elongate article thus allowing possible damage from excessive clamping force if the restraint is too small and excessive movement and wear if the restraint is too large.

Many of the clamps and restraints available on the market today, in most cases, do not permit preassembly and require expensive, time consuming removal of the attaching screw or bolt to disengage the elongate article from the clamp. These clamps also do not assure that the elongate article is held in spaced apart relation to the equipment thus, allowing the risk of wear and other damage.

Most restraining devices require special and relatively expensive manufacturing processes such as casting, injection molding, etc;. Also, most of these restraints only provide a relatively small support area for the elongate article which can result in damage due to the relatively high unit pressure therebetween. Most of these restraint devices also do not insure that the elongate article is supported in spaced apart relation from the equipment to which they are mounted thus, resulting in wear which can produce shorts in electrical wiring or leaks in fluid carrying hoses or pipes.

As a result, it is desirable to provide a mounting bracket which solves the above problems and which can be manufactured by relatively inexpensive stamping processes. It is also desirable to provide a restraint device which is adaptable to elongate articles of variable size to permit inventory of only two or three sizes to cover a wide range of sizes of the elongate articles.

DISCLOSURE OF THE INVENTION

In one aspect of the present invention, a mounting bracket for restraint of an elongate article is provided. The mounting bracket includes a transversely flat, elongate body having an outer end, a mounting end portion and a securing end portion. The mounting end portion defines a hole adapted to receive a fastener when installed on a carrier member. At least a portion of the securing end portion extends both longitudinally and at an oblique angle from the mounting end portion. The securing end portion further defines a slot in the outer end thereof, a first opening adjacent the slot, and a second opening adjacent the first opening on the side opposite the slot. One of the first and second openings is operative with a selected one of the other one of the first and second openings or the slot to receive a flexible securing element when in use. The mounting bracket secures the elongate article thereon spaced from the carrying member when installed.

The present invention provides a mounting bracket which permits use of a flexible securing element which will accept a wide range of sizes of the elongate article. The mounting bracket design permit preassembly of the mounting bracket to the carrier member prior to installation of the elongate article. The design of the present invention also permits disengagement of the elongate article from the mounting bracket without removing the mounting bracket from the carrier member. The mounting bracket of the present invention also supports the elongate member in a position spaced from the carrier member. This is accomplished by providing a mounting bracket in which the securing end portion is offset from the mounting end portion and in which the securing end portion is spaced from the carrier member and is adapted to receive a flexible securing element after preassembly of the mounting bracket to the carrier member.

BRIEF DESCRIPTION OF THE DRAWINGS

FIG. 1 is a side view, partially in section, of a mounting of the present invention secured to a carrier member with an elongate article secured thereto by a flexible securing element;

FIG. 2 is a top plan view of the mounting bracket of FIG. 1 with the elongate article and flexible securing element removed;

FIG. 3 is a cross-sectional view of a portion of the mounting bracket taken along the line 3—3 of FIG. 2;

FIG. 4 is a top plan view of an alternate embodiment of invention; and

FIG. 5 is a side view of the mounting bracket of FIG. 4.

BEST MODE FOR CARRYING OUT THE INVENTION

Referring now to the drawings, and more particularly to FIGS. 1, 2 and 3, a mounting bracket 10 for restraint of an elongate article 12 by a conventional flexible securing element or tie wrap 13 is provided. The mounting bracket 10 includes a relatively stiff, transversely flat, elongate metallic body 14 having a predetermined thickness in the range of 2.3 to 3.3 mm and a predetermined width in the range of 19 to 32 mm. The elongate body 14 includes a mounting end portion 16 which defines a mounting hole 18 and a securing end portion 19 having an outer end 20. At least a portion of the securing end portion 19 extends both longitudinally and at an oblique angle from the mounting end portion 16. The securing end portion 19 further defines a tie wrap restraining means 21 including a slot 22 in the outer end 20, a first opening 23 adjacent the slot and a second opening 24 adjacent the first opening on the side thereof opposite the slot. The supporting end portion 19 also defines a support area 25 along the upper surface thereof. The slot 22 provides a tie wrap engaging surface 27.

The first and second openings 23 and 24 have predetermined equal widths D. The slot 22 also has a predetermined width C which is substantially equal to the widths D of the first and second openings 23 and 24. The first and second openings 23 and 24 each have a length L longitudinally of the elongate body 14 and with widths D are selected to be sufficient to accept standard tie wraps 13 of the selected size as determined by the strength required to support the elongate article 12. As best shown in FIG. 1 the elongate body 14 is bent at a juncture 26 of the securing end portion 19 to the mounting end portion 16. In the specific example shown, this results in at least a portion of the securing end portion 19 being disposed at an oblique angle of approximately 170 degrees with respect to the mounting end portion 16.

As is more clearly shown in FIG. 3, the elongate body 14 is formed by stamping from a metal plate such as steel. Preferably the elongate body 14 is plated with any suitable corrosion resistant plating material. Where desired, and in the specific example shown, the securing end portion 19 is coated with a suitable nonconductive, elastomeric coating 28, for example, bonded neoprene, vinyl, vinyl plastisol, polyethylene, or latex grade LSC515 K1 per SAE J19.

The mounting bracket 10 is secured to a mounting face 29 of a carrier member 30 by any suitable fastener 32 such as a conventional cap screw 34. The cap screw 34 extends through the mounting hole 18 in the mounting end portion 16 and threadably engages a threaded hole 38 provided in the carrier 30. Accordingly, the securing end portion 16 is so shaped and arranged to be spaced from the carrier member 30 when installed thereon. It is to be understood that degree of bend and final shape of the elongate body may be as desired as long as it provides the same advantages as the specific embodiment shown and described.

An alternate embodiment of the present invention is shown in FIGS. 4 and 5. In this embodiment like elements are identified by the same reference numerals as in the embodiment of FIGS. 1, 2 and 3 with new elements identified by new reference numerals. The mounting bracket 10 of FIGS. 4 and 5 include the mounting end portion 16 and the securing end portion 19 joined in end-to-end relation essentially the same as the first embodiment. The elongate body 14 is bent at the juncture 26 of the mounting and securing end portions 16 and 19 at an oblique angle with respect to the mounting end portion of approximately 135 degrees so that at least a portion of the securing end portion 19 angles away from the mounting face 29. In addition, an outer end section 40 of the securing end portion 19 is also bent, in a direction opposite to and substantially equal to the first bend, so that the end section 40, which defines a support area 42, is substantially parallel to the mounting end section 16. Due to the double bend, however, the end section 40 and the support area 42 are spaced from the mounting face 29 of the carrier member 30 by a distance greater than the height of the head 35 of the cap screw 34. The securing end portion 19 of the elongate body 14 defines a tie wrap restraining means 21 which includes the second opening 24 and the slot 22 defined by the outer end section 40. The second opening 24 and the slot 22 are adapted to receive the flexible securing element 13 longitudinally of the elongate body 14 as previously described. It should also be understood that the slot defining portion or outer end section 40 of the securing end portion 19 may be lengthened in a manner similar to that of FIG. 1 to provide support for a second elongate article if desired. The tie wrap restraining means 21 also includes another opening 43 defined by the securing end portion 19 and adapted to receive the flexible securing element 13" transversely of the elongate body 14. The tie wrap restraining means 21 also further defines a pair of notches 44 and 46 in the edges of the elongate body 14 in substantial alignment with the another opening 43. The notches 44 and 46 and the another opening 43 each have substantially equal widths selected to accept the tie wrap 13" of suitable width for the particular application as previously described. In one specific range of applications, two mounting bracket 10, sizes are anticipated which utilize tie wraps of 7.9 and 12.5 mm widths.

It is recognized that the outer shape of the elongate body 14 and the material from which it is made could be varied without departing from the spirit of the present invention. For example, the securing end portion 19 may be bent at an oblique angle with respect to the mounting end portion 16 to reach around a corner of the carrier member 30 or extend outwardly in a direction perpendicular to the mounting face 29 thereof. One of the first and second openings 23, 24 is operative with a selected one of the other one of the openings 23, 24, or the slot 22 to receive the flexible securing element when in use so that the mounting bracket 10 secures the elongate article 12 thereon spaced from the carrier member 30 when installed. It is also recognized that different combinations of the first and second openings 23 and 24 and the notches 44 and 46 may be utilized within the scope of the invention. For example, in the embodiment of FIG. 4 if the elongate article 12" is large the tie wrap 13" may engage only the notches 44 and 46. Furthermore, it is recognized that the elastomeric coating 28 of the securing end portion 19 of the elongate body 14 may be eliminated without departing from the essence of the invention.

Industrial Applicability

In use, the versatility and great advantages provided by the mounting bracket 10 of the present invention become immediately apparent. For example, the mounting bracket 10 may be preassembled with the engine or other equipment as it proceeds down the assembly line. This is accomplished by inserting the bolt 34 through the mounting hole 18 in the mounting end portion of the elongate body 14. The bolt 34 is then threadably engaged with the threaded hole 38 to secure the mounting bracket 10 to the carrier member 30. Considerable time is saved when installing the elongate article 12 since no bolts or screws need be removed or attached. The elongate article 12 is simply attached to the mounting bracket 10 by the tie wrap 13. Because the mounting bracket 10 is made from a relatively thick steel material no lockwasher is required under the cap screw 34. With the mounting bracket 10 being relatively thick and wide it is highly resistant to bending and provides a stiff, strong support for the elongate article 12. When the elongate article 12 is installed it may be placed on the support area 25 of the elongate body 14. The tie wrap 13 is then "threaded" through the desired one of the first and second openings 23 or 24 and wrapped loosely around the elongate article 12 where the ends of the tie wrap are locked together in a conventional manner as illustrated in FIG. 1. Advantageously, the tie wrap 13 "slips" over the outer end 20 of the securing end portion 19 where it is readily engageable with the surface 27 of the slot 22. The tie wrap 13 is then drawn tight securing the elongate article 12 to the support area 25. Since the tie wrap 13 need only be "threaded" through one of the first and second openings 22 or 23 and around the outer end 20 assembly, time is greatly reduced especially where there are other close components. The spaced relationship of the securing end portion 19 with respect to the mounting face 29 of the carrier member 30 maintains the elongate article 12 in spaced noncontacting relation to the mounting face 29 to prevent wear, heat, or other damage to the elongate article. The securing end portion 19 is of sufficient length outwardly of the slot 22 to support a second elongate article 12' strapped to the elongate article 12 as depicted in phantom lines in FIG. 1.

With the alternate embodiment of FIGS. 4 and 5, an elongate article 12" may be oriented in parallel longitudinal relation to the mounting bracket 10 and secured thereto by a tie wrap 13" engaging the opening 43 and the desired one of the notches 44 and 46 as depicted by phantom lines in FIG. 4. Alternatively, if the elongate article 12" is large the tie wrap 13" may engage only the notches 44 and 46. Due to the spaced location of the support surface 40 from the mounting face 29 of carrier member 30, the elongate article 12" is held in spaced relation outwardly of the head 35 of the bolt 34. This is important to prevent damage to the elongate article 12" which could occur from rubbing on the cap screw 34.

Another aspect of both embodiments of the present invention is the ability to remove the tie wraps 13, 13' and 13" normally by cutting, and disengage the elongate article 12, 12' or 12" from the mounting bracket 10 without removing the bolt 34. This avoids the potential problem of creating a possible leak if the bolt is associated with a gasketed joint or the hole 38 opens into a fluid chamber. Since the tie wraps 13 utilized with the mounting bracket 10 of the present invention are adaptable to a relatively large range of sizes of the elongate article, two or three sizes of the mounting bracket 10 will eliminate the need for an inventory of three or four hundred of the clamps. This arrangement provides a relatively simple way of achieving the above described advantages.

The nonconductive elastomeric coating 28 reduces the risk of electrical shorts and also reduces the conduction of any heat to the elongate article 12.

Other aspects, objects and advantages of this invention can be obtained from a study of the drawings, the disclosure, and the appended claims.

We claim:

1. A mounting bracket adapted to support an elongate article on a carrier member by using a flexible securing element, comprising a transversely flat, elongate metallic body having a predetermined thickness, a predetermined width, a mounting end portion, and a securing end portion having an outer end, the mounting end portion defines a mounting hole adapted to receive a fastener when installed on the carrier member, at least a portion of the securing end portion extends both longitudinally and at an oblique angle from the mounting end portion, the securing end portion further defines a slot in the outer end thereof, a first opening adjacent the slot and a second opening adjacent the first opening on the side thereof opposite the slot, one of the first and second openings is operative with a selected one of the other one of the first and second openings or the slot depending on the size of the elongate article to receive the flexible securing element when in use so that the mounting bracket secures the elongate article thereon spaced from the carrier member when installed.

2. The mounting bracket of claim 1 wherein the mounting end portion and the securing end portion are joined at a juncture in end-to-end relation.

3. The mounting bracket of claim 2 wherein the securing end portion is coated with an elastomeric.

4. The mounting bracket of claim 3 wherein the first and second openings have predetermined substantially equal widths and adapted to receive the flexible securing element extending longitudinally of the elongate body and the slot has a predetermined width substantially equal to the widths of the first and second openings.

5. The mounting bracket of claim 4 wherein the securing end portion provides a support area having a width substantially equal to the transverse width of the securing end portion and a length greater than the area of contact with the elongate article when in use.

6. The mounting bracket of claim 5 wherein the support area is disposed substantially parallel to the mounting portion and extends longitudinally away from the at least a portion of the securing end portion.

7. The mounting bracket of claim 6 wherein the support area is spaced outwardly of the mounting end portion a distance greater than the height of the retaining head of the fastener when assembled therewith.

8. The mounting bracket of claim 7 wherein a notch is defined by the securing end portion in an edge thereof which is substantially aligned in a transverse direction of the elongate body with one of the first and second openings 9. The mounting bracket of claim 8 wherein another notch defined by the securing end portion in another edge thereof is substantially aligned with the one of the first and second openings.

10. The mounting bracket of claim 9 wherein the notch and the another notch each have a width substantially equal to the predetermined width of the first and second openings.

* * * * *